United States Patent [19]

Volk

[11] Patent Number: 4,653,146
[45] Date of Patent: Mar. 31, 1987

[54] BASKET POULTRY LEG RETAINER

[76] Inventor: Anthony J. Volk, P.O. Box 943, Turlock, Calif. 95380

[21] Appl. No.: 842,775

[22] Filed: Mar. 21, 1986

Related U.S. Application Data

[63] Continuation-in-part of Ser. No. 731,881, May 8, 1985, Pat. No. 4,615,075.

[51] Int. Cl.[4] .......................... A22B 5/00; A22C 21/00
[52] U.S. Cl. ............................................. 17/11; 17/1 S
[58] Field of Search ............................ 17/11, 1 S, 44.1

[56] References Cited

U.S. PATENT DOCUMENTS 4,051,573 10/1977 Volk ......................................... 17/11
4,293,977 10/1981 Volk ......................................... 17/11

Primary Examiner—Willie G. Abercrombie
Attorney, Agent, or Firm—Alvin E. Hendricson

[57] ABSTRACT

A poultry leg retainer formed of resiliently deformable material has a bottom cross beam with upturned ends for lodgement in the kidney openings of poultry and resiliently extensible legs extending upwardly from the beam to a three dimensional basket configuration for engagement with the hocks of poultry legs for holding such legs against the body of poultry.

6 Claims, 4 Drawing Figures

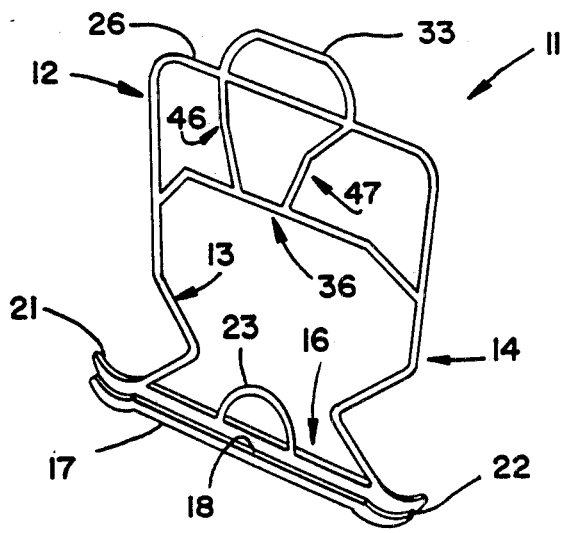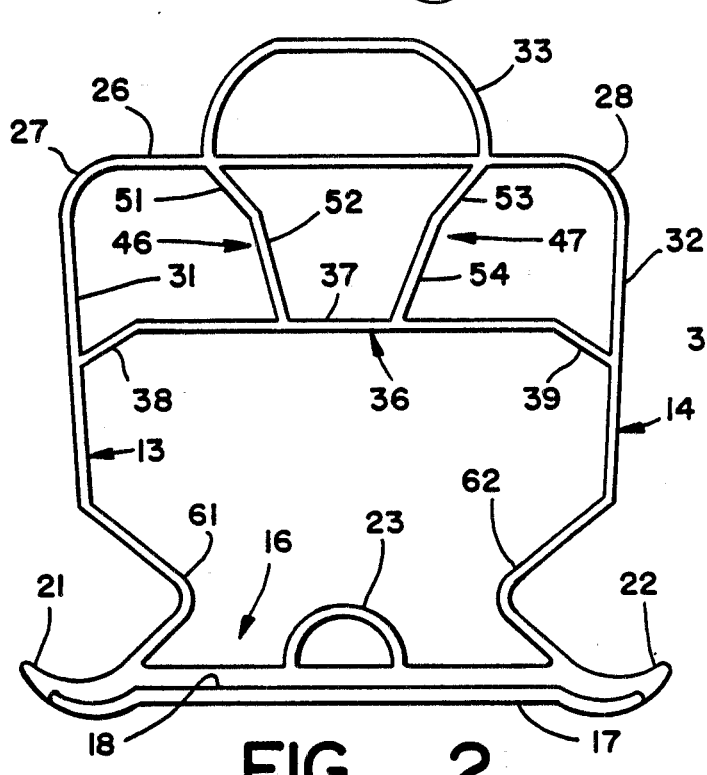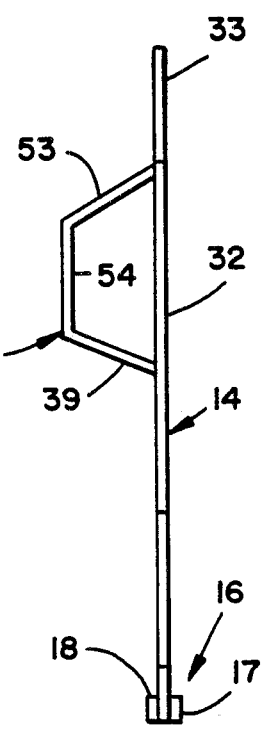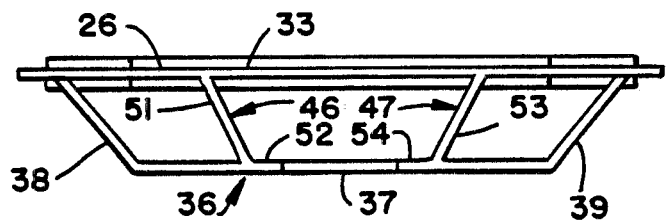
FIG_1
FIG_2
FIG_3
FIG_4

BASKET POULTRY LEG RETAINER

The present invention is an improvement on the poultry leg retainer of my prior copending U.S. patent application Ser. No. 731,881 now U.S. Pat. No. 4,615,075 issued 10-7-86 and this is a continuation-in-part of such patent application. All advantages of such prior invention are herein incorporated plus a further ease of trussing and improved capability of stacking of retainers for shipping.

BACKGROUND OF INVENTION

There has been developed a class of highly successful poultry leg retainers first formed of resilient wire and later of resilient plastic such as nylon. One of the latest of these incorporates a substantially rigid lower beam connected by convoluted or curved legs to an upper flat structure including thin resiliently deflectable strips adapted to be deformed about the hocks of poultry legs to tightly grip same. See this respect U.S. patent application Ser. No. 731,881 entitled Poultry Leg Retainer by the present inventor.

While the foregoing retainer is highly advantageous, the present invention provides a further improvement in this type of retainer by providing a three dimensional upper structure conforming to the shape of the ends of poultry hocks to minimize the degree or extent of bending of the retainer required to truss the poultry. The upper or bridal portion of the present retainer also has a taper at the top, bottom and sides in a third dimension to form a natural guide for stacking of retainers for shipping and the three dimensional configuration of the bridal hereof provides additional room for insertion of a poultry tail through the device to facilitate trussing of poultry.

SUMMARY OF INVENTION

The present invention comprises an improved poultry leg retainer having a three dimensional upper portion for facilitating the insertion of hocks in trussing and an expanded opening to more readily receive the tail of the poultry during trussing.

Upper and lower portions of the present retainer are connected by resiliently extensible legs, with the lower portion being formed as a rigid beam with pointed upturned ends for insertion in the kidney holes of poultry backbone structure. The upper portion, which may be termed a bridal, is formed of strips of resiliently deflectable plastic such as nylon which define hock engaging means. The bridal has an upper cross piece with downturned ends merging into the legs of the retainer. There is also provided an integral lower cross piece which extends between the legs below the upper cross piece and which has a central portion spaced forwardly of same with end portions inclined downwardly and rearwardly of the central portion. A pair of generally upright strips extend upwardly from the lower cross piece and outwardly from each other and thence extend backwardly and laterally outward into integral engagement with the upper cross piece. These upright strips are adapted to be fitted into the creases of hocks that are engaged by the upper and lower cross pieces for firmly trussing the legs of poultry against the body thereof across the tail of the poultry closing the rear body opening of an eviscerated bird.

The lower beam structure hereof if formed and inserted in the manner describe and illustrated in my above-noted copending U.S. patent application Ser. No. 731,881.

BRIEF DESCRIPTION OF FIGURES

The present invention is illustrated as to a preferred embodiment thereof in the accompanying drawings, wherein:

FIG. 1 is a projected view of a retainer in accordance with the present invention;

FIG. 2 is a front elevational view of the retainer of FIG. 1;

FIG. 3 is a side elevational view of the retainer of FIG. 1; and

FIG. 4 is a top plan view of the retainer of FIG. 1.

DESCRIPTION OF PREFERRED EMBODIMENT

The present invention provides a retainer for the legs of eviscerated poultry which is easily installed and removed yet provides secure trussing of the poultry. In practice, trussing is applied to poultry such as chicken and turkeys during processing to hold the legs of the poultry tightly against the body across the rear body opening and poultry tail which is tucked behind the ends or hocks of the poultry legs. This is highly advantageous in retaining the legs of poultry for packing, shipping, freezing and general handling prior to retail sale. In use the trussing device is unlatched or released from the poultry by the buyer or cook for access to the internal cavity of the eviscertated poultry. Prior to cooking, the retainer or trussing device is reattached to the poultry legs at the hocks thereof with the tails tucked behind the legs in closing relation to the rear body cavity. Thus the leg retainer or trussing device is twice employed ie. by the processor and by the cook or housewife.

It has been found that various trussing device may be difficult to remove and reattached by the housewife in view of the stiff nature of the device and the necessity of bending or deflecting portions thereof in order to engage the device with the hocks of poultry legs. The present invention provides a retainer structure that facilitates removal and reattachment of the retainer with the hocks of poultry legs to eliminate the effort required to utilizing the invention. It is furthermore noted that a retainer is normally removed from the cooked poultry and the present invention is particularly advantageous in this respect because of the three dimensional structure provided herein whereby the device may be readily slipped off the hocks by a housewife or the like even though the device securely trusses the poultry legs when engaged with same.

Referring to the drawing, there will be seen to be illustrated an improved poultry retainer 11 having an upper hock engaging portion 12 connected by resiliently extensible legs 13, 14 to a lower rigid beam element 16. This lower portion 16 is illustrated to be formed of a rigid element or beam 17 having reinforcing ribs 18 longitudinally thereof with curved pointed ends 21 and 22 adapted to be fitted into kidney holes in the back-bone portion of poultry in the manner explained in detail in my prior copending patent application Ser. No. 731,881. There may be also provided a tab 23 extending upwardly from the beam 17 between the leg 13 and 14 This tab 23 may be employed to grip the lower portion 16 of the retainer during insertion of same in a poultry backbone.

The upper portion 12 of the retainer 11 includes a thin upper strip 26 having downwardly turned or curved ends 27 and 28 and extending downwardly as vertical strips 31 and 32 merging into the upper ends of the legs 13 and 14. A generally semicircular strip 33 is disposed at the top of the upper strip 26 to provide a finger hold for attaching and removing the retainer from the hocks of poultry legs.

In addition to the foregoing, the upper portion 12 of the retainer includes a lower strip 36 extending laterally between the vertical ends strips 31 and 32 beneath the upper strip 12 and having a particular configuration, as illustrated in the drawings.

This lower strip 36 includes a central straight portion 37 parallel to the upper strip 26 and spaced below same and forwardly of a plane common to the upper strip, legs and lower element. The strip 36 also includes end portions 38 and 39 which are inclined rearwardly and downwardly from the central portion 37 to the legs 13 and 14, as shown in the drawings. It is noted that these end portions 37 and 38 may also be formed with curves with generally "S" configurations.

There are further provided as elements of the upper portion 12 of the retainer a pair of inner strips 46 and 47 connecting the upper strip 26 and lower strip 36 between the vertical end strips 31 and 32. Considering first the strip 46, it will be seen in the drawings that same includes an upper portion 51 which extends slightly downwardly from upper strip 26 and laterally inward of the retainer away from the end strip 31 and then extend as a lower portion 52 downwardly and inwardly of the retainer into integral engagement with the lower strip 36. The strip 46 may also be formed as curved strips with substantially the same configuration as described above.

The upright strip 47 is formed in substantially the same manner as the strip 46 but in a mirror image configuration and thus includes upper and lower portions 53 and 54, respectively. The strip 46 and 47 then extend downwardly and forwardly of the upper strip 26 and angled toward each other and then are curved or angled into segments descending downwardly and toward each other into engagement with the central portions 37 of the lower strip 36. It will be seen that this configuration forms somewhat of a basket arrangement, or possibly a half basket arrangement, with the lower strip 36 and inner strips 46 and 47 being partially displaced forwardly of the back plane of the retainer. This is highly advantageous in the application of the retainer to the hocks of poultry in trussing relationship thereto and removal of the retainer therefrom.

It is noted that the present invention is formed as a single integral unit of relatively rigid material that is resiliently deflectable and which is impervious to chemicals, or other substances that may come in contact with the invention. The present invention is adapted to be injection molded in a single operation and is preferable formed of nylon.

The upper portion 12 of the retainer is attached to the lower portion 16 by the legs 13 and 14 which are shown to include lower curved portions 61 and 62 which extend inwardly and then outwardly of the retainer to provide the legs with the capability of being resiliently extended in length. This is highly advantageous in adapting the present invention to engagement of poultry of different sizes wherein the poultry legs are located at different distances from the backbone structure of the poultry.

Application of the present invention to truss the legs of poultry is accomplished by inserting the lower portion 16 of the retainer in the rear cavity opening of poultry and inserting the pointed or hooked ends 21 and 22 into the kidney openings in the backbone structure of the poultry. The legs and upper portion of the retainer then extend upwardly out of this opening with the upper portion being disposed in position to engage the hocks of poultry legs. The tail of the poultry is first swung upwardly into closing relationship to the cavity opening and the legs of the poultry are drawn tightly against the body thereof in extension rearwardly of the poultry to disposed the hocks together across the body opening behind the tail. The retainer is then pivoted forwardly of the poultry to extend the strips 26, 31 and 36 about one of the hocks behind same, with the strip 46 extending along the crease in the hock. The is accomplished by lifting the retainer by the upper loop 33 and slipping the strips about the hock. It will be appreciated that the present invention is formed of resiliently deformable material so that all portions may be bent or deflected with the exception of the lower beam 17. The three dimensional configuration of the upper portion 12 of the retainer minimizes the about of bending required to attach the device to hocks of poultry.

Proceeding with the application of the retainer hereof in trussing of legs of poultry, it is noted that following engagement of one side of the upper portion of the retainer with a first hock the other side including the strips 26, 32 and 36 are pulled over the large end of the other hock with the central strip 47 seated in the crease of the hock. It is noted that the hocks of poultry are curved in three dimensions and placement of the top strip 26 behind the upper portion of the hock will then seat the strips 46 and 47 in the crease of the hocks and, with the end strips 31 and 32 also disposed behind the large ends of the hocks, it will be seen that the hocks are in fact firmly trussed and retained in position by the downward pressure of the upper portion of the retainer through the exsertion of a downward force by the deflected or extended legs 13 and 14. The bottom beam 17 is firmly anchored in position and lifting of the remainder of the retainer up over the hock then resiliently extends the length of the legs 13 and 14 so that the upper portion of the retainer is drawn tightly downward in engagement with the hocks of the poultry immediately behind the large ends thereof. The lower strip 36 need not be physically disposed behind the enlarged ends of the hocks and in fact the particular configuration of the lower strip 36 hereof provides for hock engagement without the necessity of forcing the lower strip under and behind the enlarged hock end. It is noted that this does not reduce the trussing action, but it does provide for minimizing the amount of effort require to engage the retainer with the hocks of poultry legs. Complete tight trussing is achieved hereby through the pressure engagement of upper strip 26 and upright strips 46 and 47 of the hocks of the poultry while the end strips 31 and 32 prevent lateral movement of the latter. The outer extension of the lower strip 36 also provides more room for pivoting of the tail of the poultry upwardly into closing engagement with the body opening of poultry to further facilitate trussing of the poultry legs.

The three dimensional, or basket, configuration of the upper bridal portion of the present retainer also materially faciliates removal or disengagement of the retainer from the hocks of poultry trussed hereby. It is only necessary to grip the finger loop 33 and resiliently draw the retainer upward to slip the bridal 12 from the hocks by pivoting the retainer rearwardly of the poultry. Thus the present invention materially faciliates engagement and disengagement with the hocks of poultry for trussing and untrussing of poultry.

The present invention has been described above with respect to a particular preferred embodiment, however, it will be apparent to those skilled in the art that modifications and variations are possible within the spirit and scope of the invention and thus it is not intended to limit the invention to the precise terms of descriptions or details of illustration.

What is claimed is:

1. An improved poultry leg retainer comprising
an upper strip having downturned ends merging with resiliently extensible legs having hook means at the bottom thereof,
a lower strip extending between said legs below said upper strip and having a central portion spaced forwardly of a common plane of said upper strip and hook means with end portions curved backwardly to said legs, and
a pair of central strips disposed in space relation to each other and extending forwardly of said upper strip and downwardly to the central portion of said lower strip,
whereby said strips are adapted to fit about the hocks of poultry with the central strips lying in the creases of said hocks to truss poultry legs.

2. The retainer of claim 1 further defined by said central strips extending toward each other from said upper strip and thence downwardly to said lower strip.

3. The retainer of claim 1 further defined by said strips all being integral and formed of a resiliently deformable material.

4. The retainer of claim 1 further defined by said legs being inclined slightly toward each other in extension downwardly from said upper strip.

5. The retainer of claim 1 further defined by the ends of said lower strip extending rearwardly of the central portion thereof and downwardly thereof to said legs.

6. The retainer of claim 1 further defined by said central strips extending downwardly from said upper strip and extending at an angle toward each other and then extending downwardly in straight sections inclined toward each other to said lower strip.

* * * * *